June 9, 1959 F. ROMANO 2,889,714
SPRING-LOADED SPLIT STEERING WHEEL
Filed Feb. 11, 1957
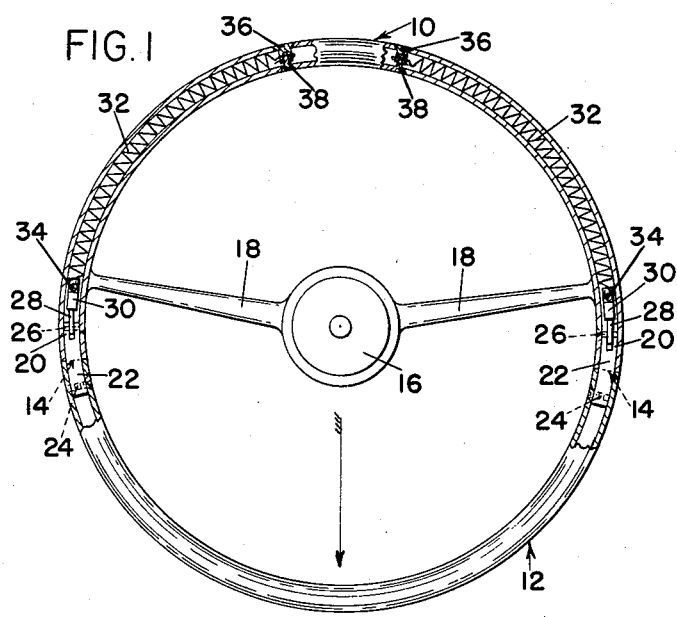
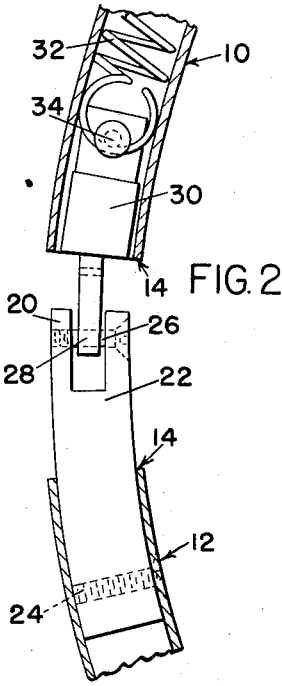
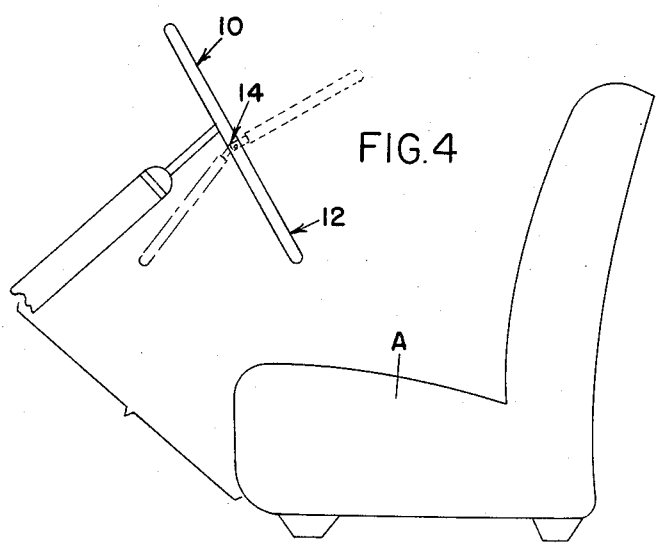
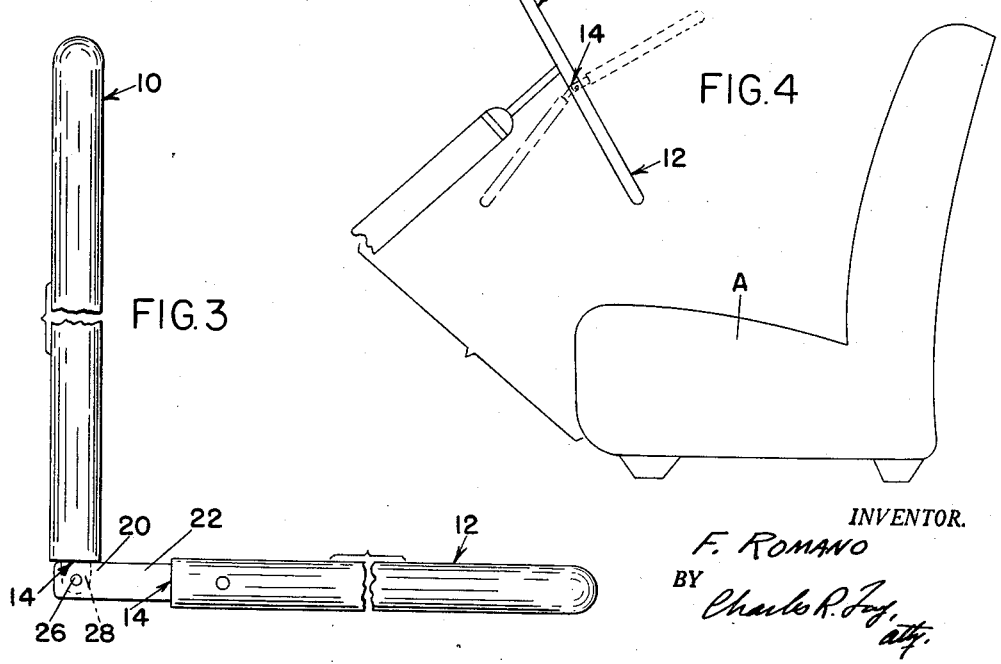
INVENTOR.
F. ROMANO
BY Charles R. Fay,
atty.

United States Patent Office 2,889,714
Patented June 9, 1959

2,889,714

SPRING-LOADED SPLIT STEERING WHEEL

Francescantonio Romano, Fitchburg, Mass.

Application February 11, 1957, Serial No. 639,540

1 Claim. (Cl. 74—493)

This invention relates to a new and improved steering wheel which is capable of folding generally centrally thereof for the purpose of providing room under the steering wheel, and between the steering wheel and the seat of the vehicle, for easy entrance and exit of the driver. Modern automobiles have been designed so low as to result in a great deal of difficulty to enter the same at the driver's side of the vehicle due to the fact that the steering wheel is very low with reference to the edge of the seat that it interferes with access to the seat; and it is the principal object of the present invention to overcome this difficulty by providing a steering wheel which is used to steer the vehicle in normal manner but which is split generally centrally thereof or just below the center and is provided with a strong pivot joint which is spring-loaded so that the steering wheel split portion may be pulled upon against the action of the springs and then swung up to avoid the difficulty occasioned by the lower half of the steering wheel.

Other objects and advantages of the invention will appear hereinafter.

Reference is to be had to the accompanying drawings, in which

Fig. 1 is a view in elevation with parts in section illustrating the new steering wheel;

Fig. 2 is a sectional view illustrating the split joint and showing the same separated;

Fig. 3 is a view in side elevation with parts broken away illustrating the manner in which the lower half of the steering wheel may pivot relative to the upper portion thereof; and Fig. 4 is a diagram illustrating the invention in use.

In carrying out the present invention, the steering wheel in general is preferably made of tubing in the general form of a steering wheel, i.e. substantially circular. This tubing comprises two separate parts, one of which is indicated at 10, this reference numeral indicating the upper portion of the steering wheel. The lower portion of the steering wheel is indicated generally at 12 and the reference numerals 14 indicate the break-away points between the two tubular members and showing where the same join each other.

In the illustration as shown in Fig. 1, the steering wheel is provided with a usual hub 16 and supporting spokes 18 both of which are secured to the upper portion 10 of the tubing above described. Thus it will be seen that the lower portion 12 of the tubing is not supported in any way except with respect to the terminal portions of the upper tubing member 10, and the latter is mounted in the usual way on the steering post.

At each end, the lower member 12 is provided interiorly thereof with a clevis 20 and this clevis is formed as a part of an arc-shaped preferably solid body member 22 which is fixed with relation to the tube 12 by any kind of conventional fastener such as the screw 24. The arc of the body 22 conforms to the arc of the tubing.

Pivotally secured in the clevis by means of a pin or fastener 26, there is a male clevis member 28 formed as a part of a stud 30 and this stud is slidably positioned in the upper tube member 10 and may also be formed on the arc of the circle of the steering wheel.

Each male clevis is constantly yieldingly urged toward a withdrawn position with respect to the ends of tubing 10 by means of tension springs 32 which are secured to the studs 30 by any convenient means such as fasteners 34. At the other end of each spring, the same is anchored by means of a retainer 36 secured to the tubing 12 by fasteners 38.

The use of the device is illustrated in Figs. 2, 3 and 4. In order to disengage the lower portion 12 of the steering portion on the upper portion 10, it is merely necessary to pull downwardly on member 12 in the direction of the arrow in Fig. 1, against the action of the springs 32 until the clevises reach the terminal portions 14 of the upper member 10, whereupon the entire member 12 may be pivoted in either direction as indicated in Fig. 4, thus providing a substantial area of access to the seat A with respect to the steering wheel itself. The parts are so made as to provide that the springs 32 will yieldingly maintain the member 12 in this position until the member 12 is swung upon the clevis pins 26, whereupon the clevises 20 will be withdrawn into the ends of tube 10, back to the original position as shown in Fig. 1.

In this condition, the clevis 20 and its body member 22 bridge the splits 14 and form good sound, solid connections between the two tubular members 10 and 12, so that the steering wheel may be used in its normal function of steering the vehicle without any danger of it coming apart or accidentally being turned to the dotted line positions of Fig. 4.

Having thus described my invention and the advantages thereof, I do not wish to be limited to the details herein disclosed, otherwise than as set forth in the claim, but what I claim is:

A steering wheel for vehicles comprising a tubular member shaped on the arc of a circle, means supporting said tubular member with respect to the steering column of the vehicle, a second tubular member formed on the arc of the circle of the first member and cooperating therewith to form a full circle as the rim of the steering wheel, a pivoted joint between said tubular members, said joint comprising a fixed body in one tubular member extending therefrom into the other tubular member, a movable body in the latter, said bodies being articulated, and a spring fixed at one end and connected at its other end to the movable body normally holding the latter within its member and the fixed body partly therein, said fixed body forming a solid telescoped connection between the tubular members at the location of the joint between the same, the second-named tubular member being retractible to free the pivot joint so that the second-named tubular member may pivot with relation to the first-named tubular member, such pivoting being possible only upon such retraction.

References Cited in the file of this patent

UNITED STATES PATENTS

| | | |
|---|---|---|
| 1,145,761 | Frazer | July 6, 1915 |
| 2,155,123 | Gerardy | Apr. 18, 1939 |
| 2,326,131 | Eschelbacher | Aug. 10, 1943 |
| 2,379,492 | Micuta | July 3, 1945 |
| 2,596,784 | Nagin | May 13, 1952 |